Patented May 27, 1941

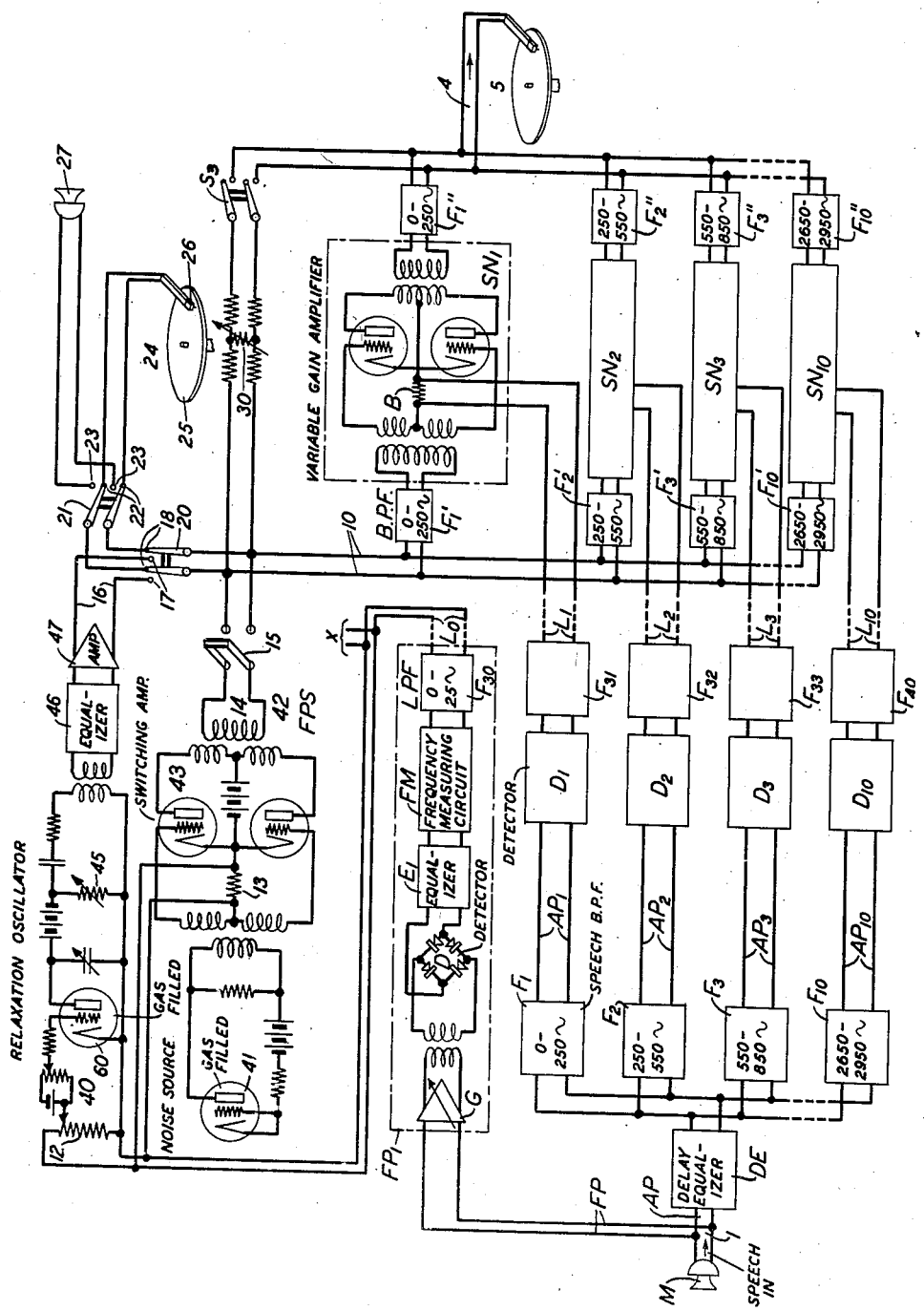

2,243,090

UNITED STATES PATENT OFFICE 2,243,090

SOUND RECORD

Homer W. Dudley, Garden City, N. Y., assignor to Bell Telephone Laboratories, Incorporated, New York, N. Y., a corporation of New York Application December 1, 1939, Serial No. 307,030

1 Claim. (Cl. 179—100.4)

This invention relates to sound records and more particularly to sound records capable of use in the reproduction of the sounds recorded thereon.

In accordance with my invention, a sound record is produced which contains a composite sound track record of sounds produced by a plurality of sound wave generating means, the sound waves produced by one sound wave generating means being modulated to obtain characteristic features associated with the sound waves produced by another sound wave generating means.

The object of the invention is to provide a sound record means by which sounds produced from a plurality of sound wave producing sources may be reproduced in composite and modulated form with all sound waves modulated to the same extent. The sound record may be, for example, formed from a sound record of a bell or other sound wave producing element and a human voice, the bell sound waves being modulated by the voice so that when the record is used for reproducing sounds recorded thereon, the output will be, in effect, bell tones speaking the words of the human voice.

The invention provides a sound record means for producing sound waves of phenomenal character so that the sound waves produced by the forces of nature or a machine or other sound wave producing means may be heard as speech. By the use of this invention the ocean waves, the wind, a running locomotive or other sound wave producing medium may be, in effect, made to talk or sing when the sound waves are reproduced from my sound record.

It is well known that the sounds produced by the ocean waves, the wind or a running machine will often produce in the mind of a listener words or music in rhythm with the audible sounds. The present invention provides a means for audibly producing the sound of the ocean waves or the running machine with the desired words or music superposed thereon.

My invention is a reproducible sound record containing a sound wave record track representing the sum of the effects of a plurality of sound producing mediums one of which may be a human voice.

The sound record may be produced in a number of different ways and may comprise an impressed piece of material impressed in a required pattern in accordance with the sounds or may be a light transmitting material having thereon a light pattern representing the sound track.

In order to produce the sound record of my invention, it is not sufficient merely to pick up through a microphone or other sound wave sensitive instrument the sounds produced from a plurality of sources and cut or otherwise record these sound waves on a blank record piece or strip as is commonly done in sound recording but it is necessary that the sound waves from one source be mixed with and impressed on the sound waves from the other source in such a manner as to modify the sound waves from one source by those from the other.

A convenient and very efficient way of attaining the desired mixing and modifying of the sound waves is to use the apparatus described in my copending application for patent Serial No. 273,429, filed May 13, 1939, entitled System for the artificial production of vocal or other sounds. In the application above-identified it is contemplated to make sound records by means of the apparatus described therein. The present application is therefore considered a continuation in part of the above-mentioned application.

In the present application, the single figure in the drawing shows, in schematic form, a suitable arrangement of apparatus for carrying out my invention. The apparatus comprises sound wave pick-up devices for picking up the desired sound waves, means for converting the sound waves into electrical currents, means for converting into electrical currents sound waves recorded on a sound record, means for electrically analyzing and filtering the electrical currents, means for synthesizing the electrical currents created from the plurality of sources, and means for recording the synthesized currents. The apparatus also includes means for artificially creating electrical waves having the characteristic of the speech or music, the waves created being of two types simulating, respectively, a buzzer-like tone and a hiss or unvoiced wave. With the exception of the electrical recording apparatus shown in the drawing, the character and functions of the electrical apparatus parts are explained in my above-mentioned pending application Serial No. 273,429.

Referring now to the drawing, speech or music currents from line or circuit $1$, energize a frequency pattern control circuit FP and an amplitude pattern control circuit AP. The frequency pattern control circuit which comprises but one channel $FP_1$ discriminates as to the frequency pattern. This discrimination includes discrimination as to the fundamental frequency when there is one. The amplitude pattern control circuit branches into a number of channels, for example, ten channels $AP_1$ to $AP_{10}$ and determines what amplitude pattern we have. For simplicity channels $AP_4$ to $AP_9$ are omitted from the drawing.

The information obtained from the speech analysis effected in these two circuits FP and AP is in the form of electrical currents which can be transmitted through any suitable transmitting medium, such for example, as lines $L_0$ to $L_{10}$ to the receiving or remaking end of the system. This transmitting medium may have a limited frequency range of transmission, of much less width than the frequency range of the speech signals to be communicated.

At the output end of the system in channel $FP_1$, the received waves act on an energy source of frequency patterns FPS so as to cause currents of the proper frequency pattern to flow from this source, and the received waves in channels $AP_1$ to $AP_{10}$ are used to control shaping networks $SN_1$ to $SN_{10}$, respectively, to give the proper amplitude pattern to the power received by these networks from the energy source FPS. We then have our reconstruction of the original speech signal coming into the microphone M for any further transmission in the ordinary manner or for recording the sound waves on the recording device 5.

The system, as shown, uses a 275-cycle total transmission band in the transmission medium between the transmitting and receiving ends of the system, that is, in the lines $L_0$ to $L_{10}$. This 275-cycle band is on the basis of eleven channels, each of twenty-five cycle pass band. Ten of these are for amplitude pattern control and the other one is for frequency pattern control.

The frequency pattern control channel $FP_1$ will first be described with reference to its adjustment for use in natural reconstruction of speech. It is a circuit for analyzing and constructing the frequency spectrum of the source of energy in speech sounds. For speech applied to its input from line I, it delivers an output wave that has discrete components and is of the same fundamental frequency as the input when a voiced speech sound is applied, and an output wave with a continuous spectrum when an unvoiced speech sound is applied. It performs three functions. First, at the transmitting or analyzing end of the system, it derives from the speech signal the fundamental or vocal cord frequency and expresses this as a current, the amplitude or magnitude of which is proportional to or some other function of the fundamental frequency. Next, at the receiving or constructing end of the system it uses this current to control the frequency set up by a relaxation oscillator so as to get back a wave of the original fundamental frequency, rich in upper harmonics. Finally, it provides for another source of energy at the receiving end, having a continuous spectrum, when there is no fundamental in the speech. This condition occurs when sounds are unvoiced as, for example, in whispering and the unvoiced consonants.

The analyzing circuit of the frequency pattern control channel $FP_1$ comprises a detector D which may be, for example, a full-wave copper-oxide rectifier, an attenuation discrimination network or so-called equalizer $E_1$ having its loss increasing with frequency, a frequency measuring circuit FM and a 25-cycle low-pass filter $F_{30}$. The speech current from line I are fed through the rectifier D, which feeds the equalizer $E_1$ which in turn feeds the frequency measuring circuit FM. This frequency measuring circuit may be any suitable circuit for delivering through the low-pass filter $F_{30}$, a direct current that depends on the number of reversals per second of direction of the voltage wave applied to this circuit and is independent of its amplitude as long as the amplitude exceeds a certain threshold value. For example, this circuit may have the form shown in Fig. 2 of R. R. Riesz, Patent No. 2,183,248, issued Dec. 12, 1939. This form is preferred on account of its being stable and free from singing, free from false operation at high frequencies, positive in action upon application of the input wave, and economical of plate battery power. In order to have the output current of the frequency measuring circuit controlled by the fundamental of the voice, the rectifier D modulates the various harmonics to give a strong fundamental and the harmonics are partially suppressed by the equalizer $E_1$. The equalizer may be any suitable network having its loss increasing with frequency so as to insure that the fundamental frequency, which may vary for example from about 80 to some 400 cycles, comes out at a high power level compared to any upper harmonics that may be present. The equalizer may practically cut off transmission above a frequency in the neighborhood of 400 cycles, for example. For practical purposes the attenuation discrimination of the equalizer purifies the fundamental tone though it may vary substantially more than an octave. The level of the unvoiced sounds must be adjusted to a value too low to cause operation of the frequency measuring circuit. If desired, for this purpose a voice amplifier G, with its gain adjustable, may be provided, for example, in the channel $AP_1$ as shown in the drawing. The direct current delivered by the frequency measuring circuit through the low-pass filter $F_{30}$ may be made substantially directly proportional to the fundamental frequency applied to the frequency pattern control channel from line I.

The direct current delivered by the low-pass filter $F_{30}$, which may be substantially directly proportional to the fundamental frequency applied to the frequency pattern control channel from line I is transmitted through line $L_0$ to the energy source of frequency patterns FPS. The latter comprises a relaxation oscillator 40 and a noise source including gas-filled tube 41 followed by switching amplifier 43 or other switching means.

The relaxation oscillator comprises gas-filled tube 60 together with circuit elements as described more fully in the Riesz patent above referred to. This oscillator generates a wave which is rich in harmonics and the fundamental frequency of which is controlled by the voltage appearing across resistance 12 due to current flow in the line $L_0$.

The noise source 42 comprises gas-filled tube 41 having its grid tied to the cathode and having suitable resistances in its plate circuit as shown together with a plate battery. This tube while shown as a triode may advantageously be a multigrid tube such as a pentode or a tetrode. It is found that this type of circuit produces a continuous energy spectrum of noise in the audio range. If desired, an equalizer or amplifier limiter (not shown) may be included between tube 41 and switching amplifier 43 to make the output flat over the frequency band. Instead of the type of noise source shown, a resistance source of noise may be used as disclosed in the Riesz application referred to.

The function of the switching amplifier is to determine whether or not the continuous spectrum of noise is permitted to pass through the circuit 14. This is accomplished under control of currents supplied across the grid resistor 13 from the control line $L_0$. The bias voltage on the switching amplifier in the absence of any voltage drop across resistance 13 is insufficient to block transmission. When voiced sounds are impressed on the system, the voltage developed across resistance 13 is sufficient to block transmission.

Conversely, the initial grid bias on the relaxation oscillator 16 is sufficiently negative so that in the absence of voltage applied across resistance 12, the tube will not oscillate. When a voiced wave is applied to the frequency measuring circuit, the resulting direct current voltage across resistance 12 is of the right magnitude and sign to cause the tube to oscillate at some low frequency for a weak input current and at higher frequencies for stronger input currents.

The equalizer 46 renders all of the harmonic components of the current wave of the relaxation oscillator 40 equal in amplitude. This may be followed by amplifier 47, if desired.

When the switch 15 is closed and the switch 20 is in its left-hand position to make contact with terminals 17, both the noise source and the relaxation oscillator are connected to the synthesizing portion of the system through circuit 10. This is the condition for natural reproduction of speech or music. In this condition switch $S_3$ is assumed to be open.

The amplitude pattern control channels are circuits which at the transmitting or analyzing end of the system measure how much power there is in the speech signal in chosen small frequency bands and transmit this information by control currents to the receiving or reconstructing end where the output of the energy source of frequency pattern FPS appearing in circuit 10 is shaped accordingly. For transmitting a speech frequency range from 0 to 2950 cycles, for example, the speech bands chosen may be, for instance, one band from 0 to 250 cycles and nine adjacent bands each 300 cycles wide, starting at 250 cycles. These bands are selected by filters $F_1$ to $F_{10}$ in the amplitude pattern control channels $AP_1$ to $AP_{10}$, respectively. Thus, of these amplitude pattern control channels used to transmit information about the amplitude pattern, the channel $AP_1$ transmits information about the amplitudes in the speech range 0 to 250 cycles. The channel $AP_2$ transmits information about the amplitudes in the speech range 250 to 550 cycles, the channel $AP_3$ information about the amplitudes 550 to 850 cycles, etc.

Considering channel $AP_1$, for example, the output from the 0 to 250-cycle speech band-pass filter $F_1$ is fed to detector $D_1$, which may be, for instance, like detector D. The syllabic frequencies in the output from the detector are passed through a 25-cycle low-pass filter $F_{31}$ and the resulting variable direct current is passed through line $L_1$. This variable direct current is then applied to a biasing resistor B to give a grid bias to a signal shaping network or push-pull variable gain amplifier $SN_1$ which accordingly varies its gain in amplifying the waves received from the energy source of frequency patterns FPS through 0 to 250-cycle speech band-pass filter $F_1'$, so that the average power in this band of waves varies in accordance with the average power in the corresponding band of the speech signals. The energy from the amplifier $SN_1$ is then fed through a 0 to 250-cycle speech band-pass filter $F_1''$ to the speech receiving circuit 4, where it is combined with the outputs from nine other speech band-pass filters (of channels $AP_2$ to $AP_{10}$) to give a reproduction of the original speech signal. It will be understood that the filters $F_1'$ and $F_1''$ have the same pass band as filter $F_1$ and that channels $AP_2$ to $AP_{10}$ are like $AP_1$ except as to frequencies involved.

In the operation of the system, the ten circuits $SN_1$ to $SN_{10}$ have their tubes biased so that when no voltage is developed across resistance B, the circuits are blocked. Thus, even though the noise from circuit 14 is impressed on these circuits, it does not get through them in the absence of applied speech currents.

When speech or other sounds are directed against the microphone M in circuit 1, the sound is analyzed for its fundamental frequency and for the flow of energy in each of the ten frequency ranges passed by filters $F_1$ to $F_{10}$ in the manner described. The currents which represent these energy flows control the transmission through the $SN_1$ to $SN_{10}$ circuits, individually, of the waves from the generating system FPS. These waves, in turn, are of the type to give a voiced sound or of the type to give an unvoiced sound, as determined by the frequency pattern channel. The result is a reconstructed speech or sound corresponding to the original or intentionally modified therefrom.

It will be seen that speech waves applied to the microphone M are analyzed and reconstructed in the system and that these reconstructed waves from the analyzed waves may be recorded on a record by the recorder 5 and that the recorded waves are shaped in accordance with the speech waves applied to the microphone M.

The system may be adjusted so that the output will be at any predetermined fundamental frequency. The voice waves applied to the microphone M may be analyzed and reconstructed in the system to a higher frequency and then recorded by the recorder 5 at the higher frequency so that they will be, for example, in the register of a female voice. Female voice waves applied to the microphone M may also be reconstructed in the system so that they will be recorded by the recorder 5 in a lower register so that they will appear, for example, as a masculine voice. In this reconstruction of the voice waves applied to the microphone M, the tones applied to the microphone M will lose their identity in the system and will be replaced by tones supplied by the tube 41 and the tube 60, the tube 60 providing buzzer-like tones and the tube 41 providing hiss tones.

In the operation of the system the ten circuits $SN_1$ to $SN_{10}$ have their tubes biased so that when no voltage is developed across resistance B, the circuits are blocked; thus, even though the noise from circuit 14 is impressed on these circuits, it does not get through them in the absence of applied speech currents.

The present invention contemplates the use of other sources of waves for purposes of reconstruction of sound. For example, the drawing shows a phonograph 24 with record 25 and pick-up 26 as one source of waves. This source is substituted for the relaxation oscillator 40 when switch 20 is thrown to its right-hand position to open contacts 17 and close contacts 18 and when switch 21 is in position to close contacts 22. At 27 is shown a microphone for picking up sound waves such as speech, music or other sounds and may be substituted for the record 25 by shifting switch 21 to its alternate position to close contacts 23. The switch 15 may be either closed or open depending on whether the noise waves supplied by tube 41 are to be used or not. An adjusted amount of the waves on the record 25 or microphone 27 can be passed directly to the output circuit 4, by closing switch S₃ and adjusting pad 30. If the switch S₃ is left open, the waves from the record 25 or microphone 27 will be passed to the recorder 5 by way of the synthesizer apparatus comprising the systems SN₁ to SN₁₀ where they will be modulated with waves coming from the microphone M. There is some advantage in having switch 15 closed and thus bringing the hiss-tone waves created by the tube 41, since without these hiss-tone waves some of the words applied to the microphone M would appear in incomplete and in some cases in not sufficiently intelligible form at the output end 4 of the system.

Some very interesting and novel effects can be obtained by use of the substitute source 25 or 27. For instance, if an instrumental rendition of the air of a song is put through circuit 10, and if the words of the song are spoken or sung into the microphone M, the reconstructed sounds appear at 4 as a song with instrumental accompaniment or as a singing instrument. With switch S₃ open, no sounds emerge except when sounds are applied at M. With switch S₃ closed, pad 30 may be adjusted to give a background simulating instrumental accompaniment. With switch 15 open, all of the reconstructed sounds must come from source 25 or 27 and in the case of words spoken into M, the articulation is less perfect than if switch 15 is closed. However, the provision of more filters in the AP lines to further subdivide and extend the range would increase the fidelity of the sounds at M without the use of the source 42.

In discussing the different effects obtainable, it will be convenient at this point to adopt terms which distinguish the waves applied to circuit 10 from those applied to circuit 1. It is seen that the waves applied to circuit 1 determine which of the SN circuits are unblocked and the extent to which they are individually unblocked. These waves will be referred to as the spectrum control waves or spectrum since they determine the amplitude pattern or amplitude distribution over the frequency band. The waves introduced at 10 will be called the pitch control or pitch waves since they furnish the actual frequencies passing through the SN circuits. For example, if a talker had a fundamental frequency of 220, the harmonics supplied from oscillator 40 would be multiples of 220 whereas another talker might have a fundamental of, say, 190 and the harmonics supplied from oscillator 40 would be multiples of 190. Or, record 25 or pick-up 27 in supplying music waves to circuit 10 would fix the pitch of the reconstructed speech. In either case the spectrum waves would not affect the pitch.

A few of the sound effects obtainable with this system will now be given by way of example, it being understood that these are but a few of the many possibilities. The record 25 may be a sound record of ocean waves, the running of a train, or the wind in a forest or such sound waves may be picked up by the microphone 27 and put into the system. Any desired sound waves may, therefore, be put into the system through the pick-up 26 or the microphone 27. A spectrum for these waves may be supplied by a talker at M, the waves obtained through the pick-up 26 or the microphone 27 will be mixed with and synthesized with the speech waves applied to the microphone M. The waves coming from 26 or 27 will, therefore, be converted into speaking waves in accordance with the speech applied to the microphone M, and will be recorded in this form by the recorder 5.

The pitch may be supplied by one singer at 27 and the spectrum from a person whispering at M. Thus, a poor singer at M can be made to appear as a good singer provided the good singer is supplying the pitch at 27. The singer at M may even sing off pitch without affecting the result.

The effect of various animated objects may be obtained. For example, if any sound of sustained character such as the rustling of leaves, falling water, the roar of surf, machinery noise, bird songs, airplane drones, thunder, etc. is used as the pitch and speech is used as the spectrum, the result is articulated sound of the type used as the pitch control so that we would then have talking leaves, taking waterfalls, etc.

The invention offers valuable possibilities in recording. For instance, if a record is played into the microphone M and if the output energy in circuit 4 is used to make another record, the translation from the first to the second record can be modified in a wide variety of ways, by use of the pitch microphone 27 or the record 25. In talking movies these possibilities may sometimes save retakes or may be used variously in a series of steps to work up the desired type of final sound record.

Where a microphone pick-up has been disclosed, it will be obvious that any other type of device for setting up electrical waves having sound wave characteristics is contemplated, including record reproducers, photocells, induction, dynamic, capacitive pick-up, etc. All types of records are contemplated including film, disc, etc.

It is recognized that the system disclosed herein is susceptible of wide variation and modification of an obvious nature in view of the examples given. All such variations and modifications are intended to be protected by this application. Moreover, the various examples, circuit details, frequency ranges and sound effects disclosed are to be construed as illustrative rather than limiting and the scope of the invention is defined in the claim which follows.

What is claimed is:

A reproducible sound record having a sound record track thereon of wave-like form representing a background cadence and with each wave in the track modified into wave-like form in accordance with a spectrum representing words, the background cadence waves in the track being so modified by the spectrum waves that when the record is played, the background cadence will be heard in the form of the spectrum words.

HOMER W. DUDLEY.